United States Patent
Neuling

[11] Patent Number: 5,947,637
[45] Date of Patent: Sep. 7, 1999

[54] AUTOMATIC TRACKING AROUND CURVED PATTERNS FOR PAINT STRIPERS

[76] Inventor: William V. Neuling, 4700 St. Johns Rd., Greenville, Ind. 47124

[21] Appl. No.: 08/948,979

[22] Filed: Oct. 10, 1997

Related U.S. Application Data

[63] Continuation-in-part of application No. 08/912,779, Aug. 18, 1997.

[51] Int. Cl.[6] ................................ E01C 23/22
[52] U.S. Cl. .................. 404/94; 239/150; 280/400; 280/402; 348/118
[58] Field of Search .................. 221/185; 239/150; 280/400, 402, 418; 404/84.05, 84.2, 84.5, 93, 94; 348/118

[56] References Cited

U.S. PATENT DOCUMENTS

| | | |
|---|---|---|
| 2,661,108 | 12/1953 | Horn et al. . |
| 2,974,875 | 3/1961 | Brown, Jr. . |
| 3,101,175 | 8/1963 | Brown, Jr. . |
| 3,286,928 | 11/1966 | Mitchell . |
| 3,477,352 | 11/1969 | Harding et al. . |
| 3,540,358 | 11/1970 | Oakley . |
| 3,979,137 | 9/1976 | Lipscomb, Jr. et al. ............... 280/402 |
| 4,155,678 | 5/1979 | Lehman et al. ..................... 414/483 |
| 4,167,592 | 9/1979 | Gabel et al. ..................... 427/137 |
| 4,761,015 | 8/1988 | Carr ..................... 280/402 |
| 4,861,190 | 8/1989 | Glassel ..................... 404/93 |
| 4,893,751 | 1/1990 | Armstrong ..................... 239/150 |
| 5,027,200 | 6/1991 | Petrossian et al. ..................... 348/118 |
| 5,052,854 | 10/1991 | Correa et al. . |
| 5,263,789 | 11/1993 | Torntore et al. ..................... 404/93 |
| 5,718,534 | 2/1998 | Neuling ..................... 404/94 |

Primary Examiner—James A. Lisehora
Attorney, Agent, or Firm—Laurence R. Brown

[57] ABSTRACT

A superior performance highway striping system is provided with various features including single person operation for different kinds of striping requirements and simplified automatic tracking around curved striping patterns provided by articulation at a ball joint between a towing truck and trailer paint striping unit. A common non-dedicated pick-up truck tows a trailer mounted modular paint striping system that may be broken down into a hand pushed parking lot type of striper sub-system or a ride behind motorized airport runway striper sub-system for a versatility of operational environments with one or two coat striping in multiple colors and widths. The towed trailer carries two 55 gallon paint drums of different colored paint, loaded and unloaded by a one person loading winch. Thus, the striping system controlled by a single person provides the versatility of on-highway and off-highway striping.

14 Claims, 3 Drawing Sheets

AUTOMATIC TRACKING AROUND CURVED PATTERNS FOR PAINT STRIPERS

This is a continuation-in-part of my co-pending patent application Ser. No. 08/912,779 Filed Aug. 18, 1997 for ARTICULATED TRACTOR-PAINT STRIPER SYSTEM FOR TWO-LAYER STRIPING.

TECHNICAL FIELD

This invention relates to paint striping systems for tracking paint stripes around curved painting patterns and more particularly it relates to single operator control of a versatile general purpose modular highway speed paint striping system that may be broken down into simpler sub-systems for walk-behind and ride behind off-highway painting of single stripe, multi-stripe and multi-color striping patterns.

BACKGROUND ART

In order to permit a truck driver to control painting of stripes along a highway from the truck cab while driving and following a painting pattern formulated by a previously painted stripe, a set of pre-aligned markers, or the edge of the road, there have been developed video monitoring systems for both monitoring the marked path and for monitoring the painted stripes which are laid down at the rear end of the truck. For example, C. F. Brown, Jr. in U.S. Pat. No. 3,101,175, Aug. 20, 1963 for ROAD STRIPING MACHINE WITH ELECTRONIC SIGHT has a video monitor in the truck cab for monitoring the truck position relative to the pattern being followed. Another example, as depicted in FIG. 4, is a commercial highway striping system available from Graco, Inc., Minneapolis, Minn. with a truck cab mount video monitor and painting control system communicating with a towed trailer paint striping system having a video camera viewing the stripes being painted at the rear of the trailer. Thus, the single driver-operator can visually follow an existing roadway stripe for example and monitor the results on the video monitor without having to look backward and take attention off the roadway.

However, in such towed trailer or rear mount truck paint striping systems, there is a significant tracking problem in painting stripes having a curved pattern, since the rear end does not track around a curve similarly to the front end of the truck where the driver sights and follows a striping pattern such as a previous stripe, a set of markers previously laid down, or the edge of the road.

As evidenced by W. R. Mitchell in U.S. Pat. No. 3,286,928, Nov. 22, 1966 for HYDRAULIC COMPENSATION OF HIGHWAY STRIPING EQUIPMENT, it is known that the problem of compensating for mistracking encountered in following highway stripe markers about curves in the highway when rear painting gun mounts are mounted behind a truck can be solved by employment of a hydraulically driven servo system linked to the truck steering system to laterally move the paint striper gun to compensate for the tendency to mistrack. However, this requires an expensive, complex servo system that introduces its own set of problems in operation and the custom installation of the servo system on a dedicated highway striping truck.

Other systems of compensation require steering by a second striper person riding a steerable trailer being towed behind the truck, such as the trailer disclosed in J. P. Oakley's U.S. Pat. No. 3,540,358 of Aug. 21, 1968 for MARKER BUTTON SETTER. The requirement of a two man painting crew, one to drive and one to steer is too labor intensive to use for many competitive striping operations.

Furthermore, there is in the prior art an assortment of several different types of mutually incompatible special purpose striping systems, such as walk-behind slow speed stripers, highway truck high speed stripers, and intermediate speed tractor pushed riding stripers. This requires a large inventory of dedicated equipment for handling various small scale and large scale striping jobs.

Other complicated types of stripers require multiple person crews for operation, one to drive-one to paint, for example, or one to drive and two to lift heavy paint barrels into place on a truck bed. However, there is no known universal system that can be idealistically operated by one person to implement with the same paint striping system (a) slow speed manually hand driven parking lot striping, (b) a ride-on intermediate speed striper for airport runway striping, and (c) a high speed single or multiple stripe truck propelled striping system.

There is also the auxiliary problem in the line striping industry of a dedicated special purpose truck with built-in paint striping features that cannot usually be used for other purposes.

Thus, this invention has the objective of providing a striping system that is universal enough to excell at slow, intermediate and high speed striping operations under control of a single driver-operator.

More specifically this invention has the objective of providing a system which does not require an extra operator to steer, to load paint, or to share the painting chores with the driver.

Additionally this invention has the objective to provide an integrated modular paint striping system that excells at low, intermediate or high speed striping and which does not require a dedicated tow truck, but operates from a multi-use truck such as a pick-up truck and requires only a single driver-operator.

A further object of this invention is to release the paint striper tow truck for other purposes when not employed for striping.

Another object of the invention is to provide a modular paint striping system that comprehensively covers various paint striping jobs, small and large, with a single operator that drives, stripes and converts the modular system to sub-systems for off-highway use.

Other objects, features and advantages of the invention will be found throughout the following description, drawings and claims.

BRIEF DESCRIPTION OF THE INVENTION

This invention features a high speed highway paint striping system located in a trailer towed by a non-dedicated pick-up truck, for example, with an automatic tracking system for painting curved striping patterns. The tracking feature is simplified with the trailer and truck being coupled in an articulated hitch joint configured to produce automatic tracking controls for painting curved striping patterns. The trailer mounted paint striping system is further configured as a one-operator system controlled by the tow-truck driver. This is accomodated by means of video communications and electronic controls coupled between the truck cab and trailer mounted paint striping controls.

Furthermore the trailer paint striping system features a set of trailer mounted, removable, modular units for one-operator conversion, adaption and control for separation into sub-systems for (a) walk-behind paint striping of parking lots, and the like, and (b) ride-behind intermediate speed striping of airport runways, and the like, in addition to (c) the high speed highway striping system with the trailer attached to a pick-up truck.

This versatile paint striping system provides for striping in different colors and widths and for applying two coats plus beads in one pass while accurately registering the second coat on the first coat stripe, even when striping curved striping patterns. Other features and advantages will be found throughout the following descripton.

BRIEF DESCRIPTION OF THE DRAWINGS

In the accompanying drawings, wherein like features are identified by common reference characters.

THE PREFERRED EMBODIMENT

The disclosure of the parent application is adopted herein in its entirety by reference, to avoid undue detail and length herein.

Figure 1:
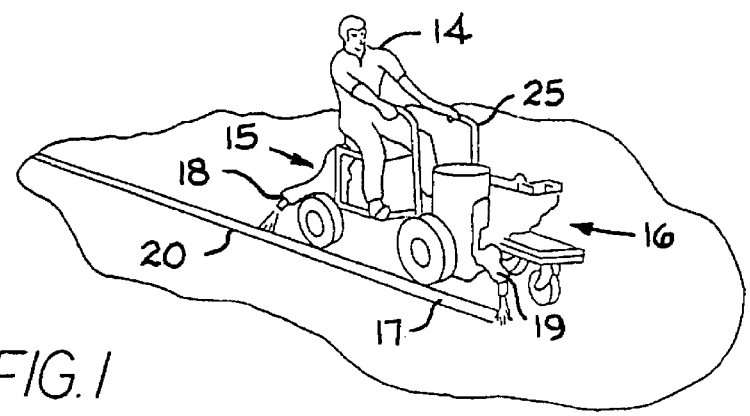
FIG. 1 is a perspective sketch of a ride-on rear-drive modular striping unit embodiment provided by this invention with the capability to lay down two coats of paint on the stripe pattern in a single pass.

As may be seen in FIG. 1, this invention permits an operator 14 to ride on a rear motor drive tractor unit 15 articulated to a front paint striper unit 16 and steer the striping system by way of handlebars 25 on the front articulated unit 16 with good visual control over the striping 17 being laid down from the front paint gun 19.

By way of stripe painting and/or beading equipment carried by the driver tractor unit 15, a second paint stripe coating 20 is precisely laid down in registration with the stripe 17 from the rear paint gun 18 located on the trailing unit 15. As will hereinafter be shown, the system is supplied with features aiding the operator to provide precise tracking control when encountering curved line striping. The system is capable of painting simultaneously one or more stripes in one or more colors and widths, and may produce first and second coats in the same pass of the striping vehicle.

Figure 2:
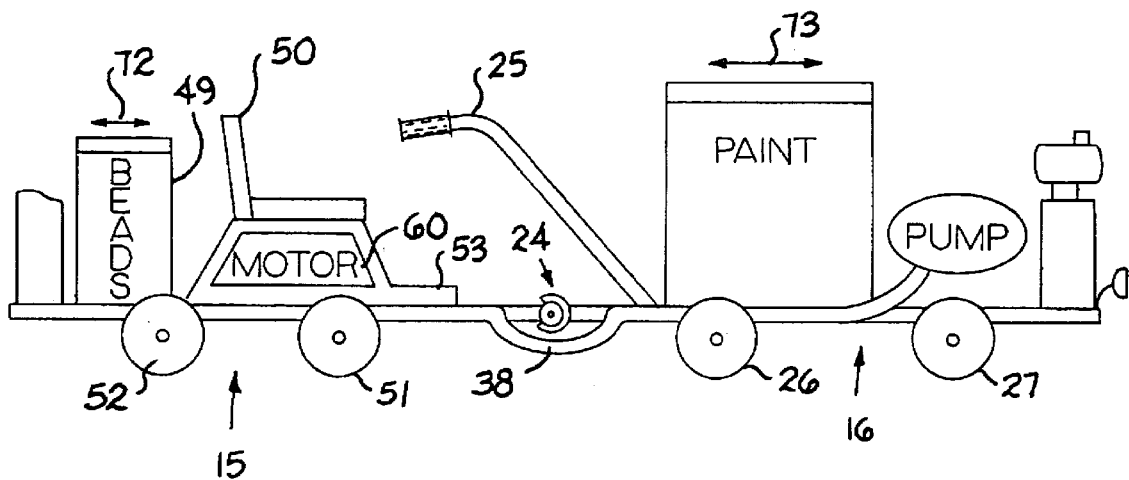
FIG. 2 is a side view schematic of an articulated set embodiment of the invention comprising a rear tractor drive, ride-on unit and a disconnectable walk-behind front paint striper unit.

Now with reference to the striping vehicle embodiment of FIG. 2, the modular rear-drive, ride-on unit 15 and the walk-behind, handlebar steered stripe painting unit 16 are articulated at the universal ball hitching joint 24, which permits the units to articulate in both vertical and horizontal modes of operation. Thus, for the four wheeled modular units 15, 16, the units may be transported or steered around curved striping patterns by depressing the handlebar 25 to raise both the frontmost wheel set 27 and rearmost wheel set 52 off the driving surface. The full eight wheel array is advantageous for straight line striping with little operator attention to steering.

The leading paint striper unit 16 with the steering handlebars 25 has four wheels arranged in back and front wheel sets 26, 27. Two paint storage bins 28, 29 and corresponding paint dispensers (not shown) permit the striper to direct paint in two different colors to respective paint striping guns. Gun rack rods carrying one or more paint striping heads can extend laterally from either side of the unit. Typically for airport runway striping, a gun rack can carry two outer paint guns for painting a pair of parallel six inch wide black stripes, alongside a twelve inch yellow stripe painted by a center paint gun. Or, for highway use, the paint in a single paint gun or dual paint guns may be changed from white to yellow.

The trailing paint striper unit 15 carries a similar gun rack rod (not shown), which for painting the aforesaid black and yellow stripes arrays outer paint guns and a center gun in position for registration and tracking with the three stripe line made by the front striper unit 16 to paint a second striping coat in exact registration with the first striping coat, which is furthermore tracked about curved striping patterns. The paint is supplied from the front striper unit 16 by way of the cable 38 connected between the leading and trailing striper units 16 and 15.

Furthermore, the trailing striper unit 15 carries a further rearmost gun rack rod, with aligned beading guns for dispensing glass beads on the double coated stripes, as provided by a compressor assembly (not shown) for processing beads from the bead tank 49 carried on the trailing striper unit 15. Thus, the paint striper system in one pass of the vehicle puts down a first stripe pattern, a second coat on the stripe pattern, and a final coating of beads, all in exact registration over either a straight or curved line path, where tracking is implemented in a manner hereinafter shown to be made possible as a result of articulation of the two units 15, 16 at the ball joint coupler 24.

The vehicle is powered by the motor 60 disposed under seat 50, where the operator sits to steer the vehicle by means of handlebars 25 with feet upon footrest 53. The drive wheel set 51 is nearest to the coupling joint 24 and is trailed by the rear wheel set 52 of the four wheel array.

Figure 3:
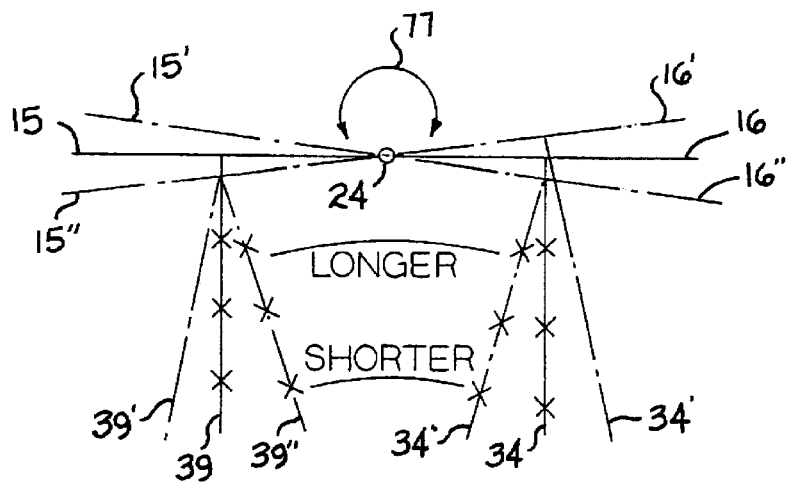
FIG. 3 is a schematic diagram illustrating the operation of the simplified automatic tracking control mode of operation provided by this invention.

FIG. 3 schematically represents by the straight line 16 the trailing unit articulated about universal joint 24 in the horizontal mode of articulation indicated by arrows 77. Similarly the leading unit is represented by straight line 15. Extending perpendicularly from these units at equal distances from the articulation joint are the gun racks 34, 39. Two phantom views are superimposed to respectively represent the action of the gun racks 34, 39 as the vehicle is steered to articulate respectively upwardly or downwardly as shown in the sketch enabling the articulated vehicle to follow curved lines respectively along inner and outer arcs of the parallel stripe striping pattern. When the gun racks 34, 39 converge, the inner tracks are longer and the outer tracks are shorter in a proportion that makes the guns track about the curvature automatically. When the gun racks 34, 39 diverge about a curve, the outer tracks are longer and the tracking automatically compensates in the same manner.

It is thus seen by converging and diverging gun rack action that the striping system of this invention automatically shortens or lengthens stripes closest to the vehicle when tracking around curves. Thus, the second coating may be laid down precisely in registration over the first coating, and the striping pattern tracks about curves to overcome the problems of shifting and skewed stripe dimensions where the prior art equipment would tend to fight the required different lengths of stripe line arcs for the inner and outer stripes. With this automatic tracking feature, the shorter and longer painting paths the stripes take at the outer and inner radii of a curved path are automatically compensated for by the converging and expanding postures of the gun racks 34, 39 in the horizontal mode of articulation. The same is true of a single stripe, where the arc length is appropriately automatically adjusted for the sharpness of the curve in the striping pattern.

In operation, it is seen for the articulated position 15', 16', the angle between the guns moves from parallel and diverge outwardly from the vehicle 15, 16. In this respect, the shorter paint lines over the arc of curvature are nearest the striper units 15, 16. Likewise for the articulated position 15", 16", the angle converges. To paint the longer stripe paths closer to the striper units 15, 16 in the arc of curvature.

Figure 4:
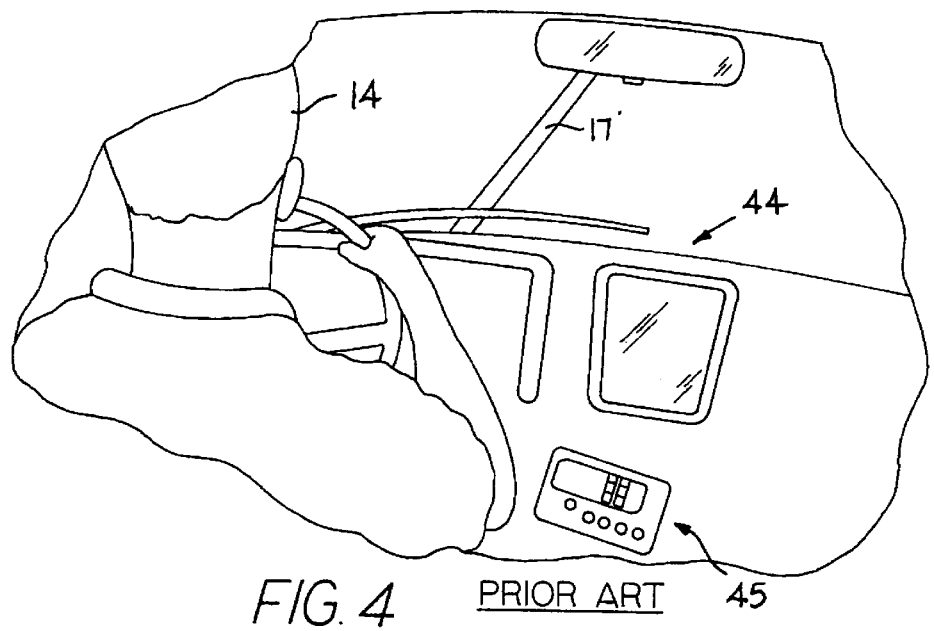
FIG. 4 is a rear view broken away, looking into a towing truck cab at a video camera monitor and remote electronic paint control system that permits the single driver to monitor both the highway ahead and to control the paint striping operations being laid down by a system towed in a trailer.

In FIG. 4, the single operator 14 is driving a pick-up truck or the like along a highway following stripe pattern 17' as a guide for painting one or more stripes with a following striper system located primarily on a trailer unit hitched to the truck. To facilitate one person operation of highway striping at high speeds, the operator 14 can visually monitor a video screen 44 preferably having a split screen receptive to corresponding video camera locations for observing both a striping pattern being followed in front of or alongside the towing truck and one being painted to the rear of the driver 14. The corresponding video images are produced by way of two suitably directed video cameras (not shown) respectively pointed to the striping pattern being followed by the towing truck and disposed rearwardly from a trailer mount to monitor the current stripe or stripes being painted. Thus, the operator need not divert vision from the roadway in front of the tow truck by looking backward to monitor the striping being painted to assure that it is following the desired pattern and placement.

Furthermore the electronic control panel 45 communicates with the painting trailer striping system being towed to operate the painting gun and paint source controls, typically solenoid controlled in response to the instructions from the control panel 45, thus permitting the single operator to both drive and control the painting of a stripe pattern as required.

Figure 6:
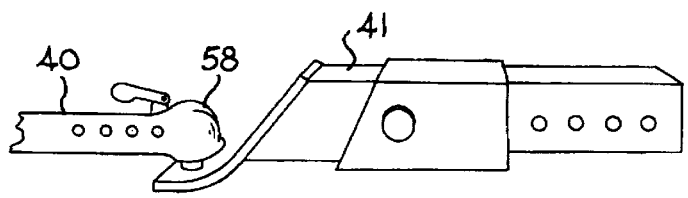
FIG. 6 is a side view fragment of a telescoping trailer hitch assembly affording adjustable lengths in both the trailer hitch and truck hitch arms, comprising a tracking adjustment feature.
Figure 5:
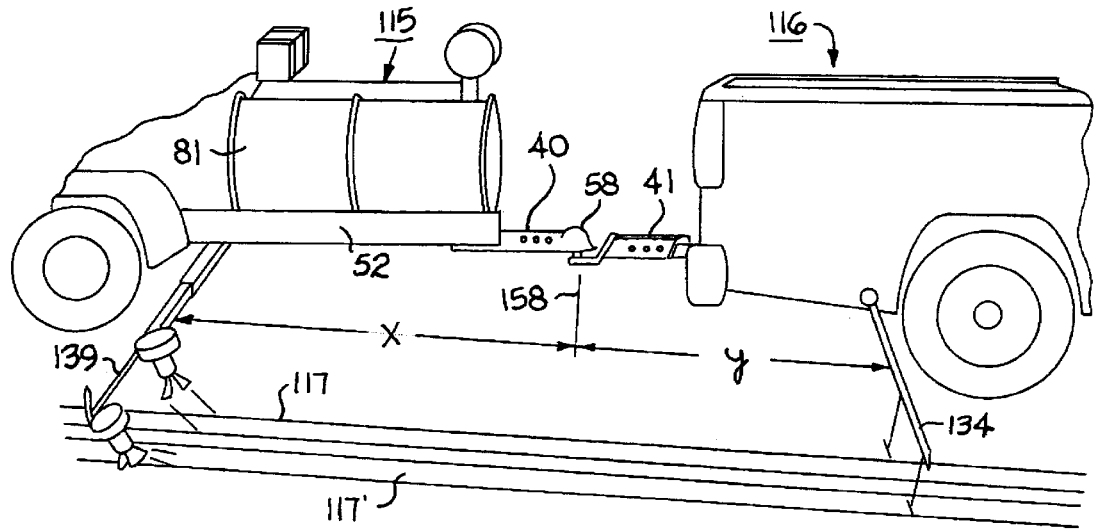
FIG. 5 is a side view fragmental sketch of an articulation joint between a towing vehicle and a paint striping trailer assembly which automatically adjusts to provide tracking of paint stripes passing around curves in the striping pattern.

As seen from FIGS. 5 and 6, the towing truck unit 116 is articulated to the trailer striping unit 115 at the universal joint 58 in a manner similar to the hereinbefore described units operating as shown by FIG. 3 to afford automatic tracking. In order to track properly about the curved paths, the front gun or video camera rack 134 respectively paints a first of two coats to be applied on one vehicle pass or monitors the pattern of the striping pattern, typically two stripes 117, 117'. For accurate tracking, the front rack 134 is mounted the same distance (y) in front of the articulation plane 158 as the rear rack 139 distance (x) behind the articulation plane 158.

To allow for differences in truck and trailer dimensions between the respective wheels, while assuring the automatic tracking feature of this invention, both the respective trailer hitch post 40 and tow truck hitch post 41 are telescoped for initial adjustment of the position of the articulation joint 58.

The towing truck 116 need not be a dedicated paint striping unit but may be used for other purposes, and for this reason the front gun rack 134, may be temporarily attached by a suitable coupling such as a magnetic latch. Also disconnectable plug in cables and hoses may be used so that the trailer unit can contain all of the painting accessories and controls for independent operation apart from the tow truck. As will later be discussed, the rear gun rack 139 may be a temporary mount on the trailer 115 that is connectable to a modular painting system removably carried on the cargo bed of the trailer 115.

Figure 7:
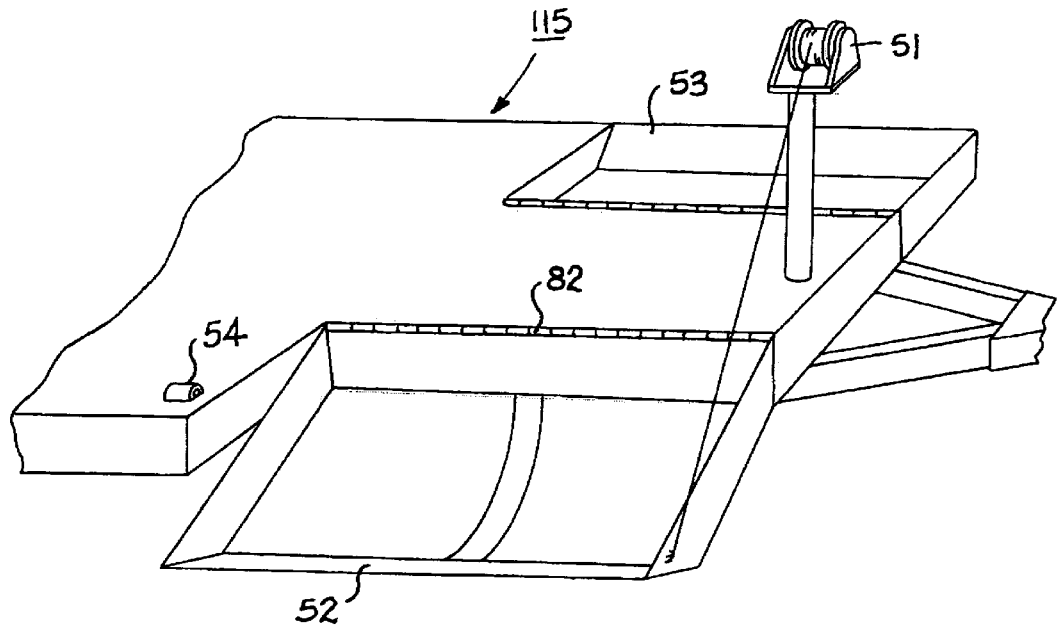
FIG. 7 is a fragmental perspective view of a front portion of the trailer showing the winch controlled loading feature for permitting a single operator to load 55 gallon paint drums.

Since paint for long highway striping operations is preferably taken from their initial 55 gal drums, which are difficult for one operator to handle. The view of FIG. 7 shows the front portion of the trailer unit 115, wherein a winch 51 is mounted between the barrels 81 carried on either side of the trailer as shown in FIG. 5. For respectively lowering and raising the drums with mechanical assistance, the hinged (82) side panels 52, 53 are equipped to retain respective resident 55 gal paint drums 81, thus, being locked in place by pins 54, etc. when the trailer is being towed. For replacing or mounting the barrels 81 into the respective receptacle hinged panels 52, 53, the operator may roll a barrel of paint onto the side panel 52 when lowered by winch 51 which thus lifts the drum up onto the trailer bed, where it is locked in place for use in the striping operation. The head of the winch 51 is rotatable for use on the other side of the trailer to raise and lower the side panel 53. Typically both white and yellow paint may thus be stored for selection of paint colors in highway painting operations.

Figure 8:
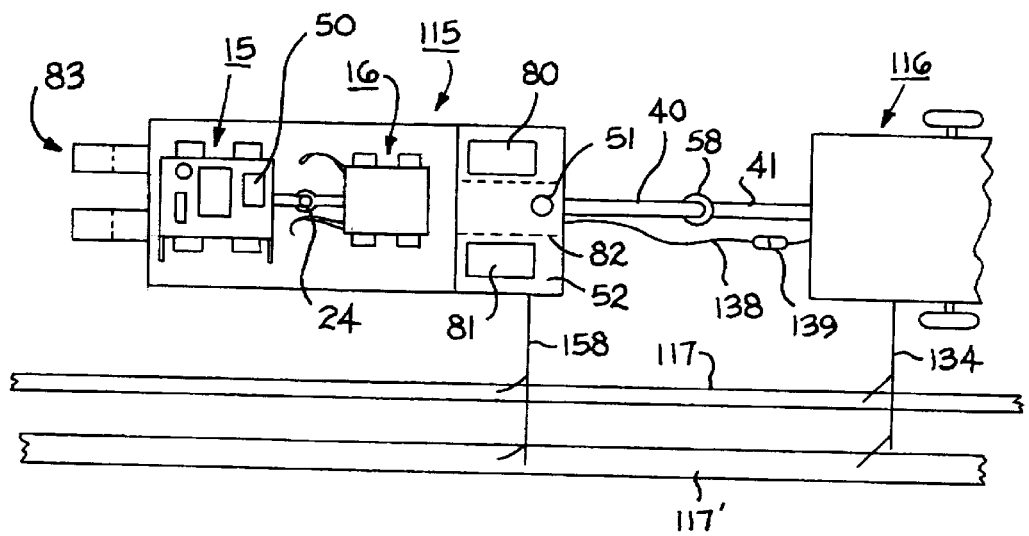
FIG. 8 is a schematic plan view diagram of the modular truck trailer painting system that affords a versatile choice of paint striping sub-systems by the single operator.

In FIG. 8, the pick-up towing truck 116 is articulated at universal joint 58 to the trailer 115 which carries a modular unit paint striper system, with the exception of a few accessories such as the paint gun rod 134 extending laterally from the side of the truck 116 and the cab mounted video monitor and control system of FIG. 4. The cable 138, having a disconnect plug 139, serves to communicate with wiring and paint carrying conduits, as necessary. The paint gun rods 134 and 158, which can paint in two colors the stripes 117 and 117' with two registered coats of paint on one pass, extend laterally from either side of respectively the trailer 115 and tow truck 116. The gun racks may also carry video camera monitors for viewing of the striping patterns of each of the stripe coats.

The paint barrels 80, 81 are held at the trailer bed level on the side panels 52, hinged at 82 for lifting aboard with the help of winch 51 as hereinbefore explained. However each of the modular units, 15 and 16 have on board facilities for storing paint and beads so that they may be removed from the trailer and used in off-highway operations.

The painting system on the trailer 115 is modularized in this embodiment with two separable and independently operable modules, namely the walk-behind manually operable striper unit 16, articulated at disconnectable universal joint 24 to the motorized, ride-on push tractor/striper unit 15. Such a unit is shown in FIG. 2. These units are mounted replaceably upon the trailer 115, which preferably has the rear end foldable ramps 83 for aiding a single person to load and unload the units 15 and 16 from the trailer 115, when it is desirable to change from the high speed highway mode of operation into one of the off-highway modes of walk-behind or ride-behind painting of parking lots, airport runways and the like, which cannot be painted from the trailer 115 and tow truck 116 array. For highway operations, various accessories are connected between the modular units and the trailer body for control of the system striping operations, including means for selecting paint colors, paint gun heads and sources of paint, including those on either the modular units or the trailer bed.

Thus, the striping system is a substantially universal system that requires only one driver-operator for the variety of paint striping modes of operation afforded.

It is therefore seen that this invention provides a multi-purpose paint striping system for on-highway and off-highway use. For high speed highway striping, a trailer carrying the paint striping system, preferably in sub-system modular format that permits off-highway use of individual modules for special purpose striping in parking lots and the like. For highway use, the trailer is towed along a highway by a non-dedicated truck for control of the striping by the truck driver.

For off-highway use of the modular paint striping system carried by the trailer, there is at least one operable paint-striping module for off-loading and operation by a single operator. One such module is a walk-behind, handle-bar controlled paint striping system, ideal for use in parking lots. A second such module is a motorized ride-on, push-tractor drive unit for articulation to the walk-behind paint striper module, with or without on-board striping apparatus that permits the connected array to paint stripes with two paint coats with one pass of the array.

Both the motorized ride-on array and the highway trailer-tow truck array are articulated at a universal joint between the units and sensing or painting units laterally extended therefrom to produce simplified automatic tracking for painting around curved paint striping patterns.

Having therefore advanced the state of the art with novel features and improved paint striping system performance, particularly with a versatile system operable by a single person, those features of novelty relating to the spirit and nature of this invention are defined with particularity in the following claims.

I claim:

1. A paint striping system for automatic tracking around curved striping patterns, comprising in combination,
   a towing vehicle structured for a driver to follow a striping pattern visible from the towing vehicle while driving the towing vehicle, said towing vehicle having a rear end trailer hitch extending therefrom to receive a trailing striping unit,
   an unmanned striper trailer unit having a head end trailer hitch extending therefrom for coupling to the trailer hitch on said towing vehicle by an articulation joint comprising a universal joint connection, and
   at least one paint striping gun mounted extending laterally from the striper trailer unit at a location rearward of said universal joint connection thereby to automatically track around curved paths in said striping pattern being followed as a function of the articulation of the towing vehicle and striper unit as the driver in the towing vehicle follows the striping pattern in front of the vehicle.

2. The paint striping system of claim 1 further comprising:
   a video monitor visible to said driver in the towing vehicle without looking backward and to divert the eyes off-road,
   paint striping control means available to said driver in the towing vehicle for control of striping from the paint striping gun in said striper unit when being towed by the towing vehicle, and
   a video camera carried by the trailer unit to view at least one stripe being laid down for indicaing alignment and position referenced to the trailer unit of a striping pattern being painted by the paint striping gun.

3. The paint striping system of claim 2 further comprising a second video camera carried by the towing vehicle that monitors a striping pattern to be followed, and
   means on said monitor for viewing both the pattern being followed and the striping pattern being painted simultaneously.

4. The paint striping system of claim 1 wherein said at least one paint striping gun further comprises means located upon and laterally extending from the towing vehicle ahead of the articulation joint to paint an initial stripe pattern and means comprising said laterally extended at least one striping gun on the trailer for painting a second stripe pattern coat in registration upon the initial painted stripe pattern.

5. The paint striping system of claim 1 with striping guns laterally extending from both the towing vehicle and trailer unit further comprising trailer hitch means disposed between the towing vehicle and the trailer unit for adjusting the distance between the universal joint and the striping guns.

6. A paint striping system for automatic tracking around curved striping patterns, comprising in combination,
   a towing vehicle structured for a driver to follow a striping pattern visible from the towing vehicle while driving the towing vehicle, said towing vehicle having a rear end trailer hitch extending therefrom to receive a trailing striping unit,
   a striper trailer unit having a head end trailer hitch extending therefrom for coupling to the trailer hitch on said towing vehicle by an articulation joint comprising a universal joint connection,
   at least one paint striping gun mounted extending laterally from the striper trailer unit at a location rearward of said universal joint connection thereby to automatically track around a curved striping pattern as a function of the articulation of the towing vehicle and striper unit as the towing vehicle follows the striping pattern in front of the vehicle, and
   a wheeled trailer unit having a load receiving bed and a removable hand steered paint striping unit removably affixed upon said load receiving bed adapted for control of stripe painting both when being towed by the towing vehicle and as a modular unit, said removable unit comprising a manual walk-behind unit with handlebar steering.

7. The paint striping system of claim 6 further comprising painting means for controlling the removable hand steered paint striping unit for dispensing paint for highway striping, and paint distribution means comprising at least one paint gun system mounted upon and extending laterally from said trailer unit for striping removably connected to the hand steered paint striping unit for the painting of highway stripes.

8. The paint striping system of claim 6 further comprising means located on said trailer to removably receive and secure in place at least one paint barrel.

9. The paint striping system of claim 8 further comprising a winch on the trailer unit for mechanically lifting paint barrels on to the trailer unit.

10. The paint striping system of claim 6 further comprising ramp means on said trailer unit for moving the hand steered paint striping unit on and off the trailer unit.

11. A paint striping system for automatic tracking around curved striping patterns, comprising in combination, a towing vehicle structured for a driver to follow a striping pattern visible from the towing vehicle while driving the towing vehicle, said towing vehicle having a rear end trailer hitch extending therefrom to receive a trailing striping unit, a striper trailer unit having a head end trailer hitch extending therefrom for coupling to the trailer hitch on said towing vehicle by an articulation joint comprising a universal joint connection, at least one paint striping gun mounted extending laterally from the striper trailer unit at a location rearward of said universal joint connection thereby to automatically track around a curved striping pattern as a function of the articulation of the towing vehicle and striper unit as the towing vehicle follows the striping pattern in front of the vehicle, and a paint striping system carried by said trailer having modular units removable from the trailer for one person operation in off-trailer locations including a walk behind paint striping unit and a ride on power driven striping unit.

12. The paint striping system of claim 11 further comprising, interconnected appliances disposed on the towing vehicle including a video monitoring and control system for in-cab viewing by said driver, a set of paint striping guns mounted to extend laterally away from either side of said towing vehicle, and disconnectable interconnections between the towing vehicle and the trailer for communicating with the interconnected appliances.

13. A multi-purpose paint striping system for on-highway and off-highway use, comprising in combination, a trailer adapted to be towed by a truck along a highway, and a modular paint striping system carried by the trailer comprising at least one operable paint-striping module for off-loading and operation by a single operator wherein said modular paint striping system comprises an articulated joint between the truck and trailer and paint striping guns extending laterally from at least one side of the joint configured to paint a stripe that tracks around curved paths.

14. A multi-purpose paint striping system for on-highway and off-highway use, comprising in combination, a trailer adapted to be towed by a truck alonf a highway, and a modular paint striping system carried by the trailer comprising at least one operable paint-striping module for off-loading and operation by a single operator, paint barrel mounting and securing means on a bed platform of said trailer, and a winch for lifting paint barrels up to the bed platform.

* * * * *